June 18, 1963 H. HURVITZ 3,094,339
CONVERTIBLE BABY CARRIAGE
Filed May 14, 1962 4 Sheets-Sheet 4

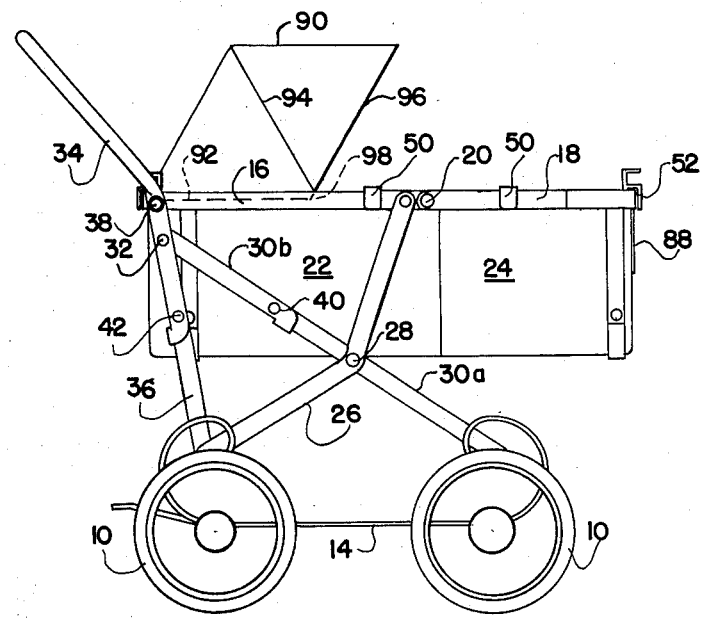
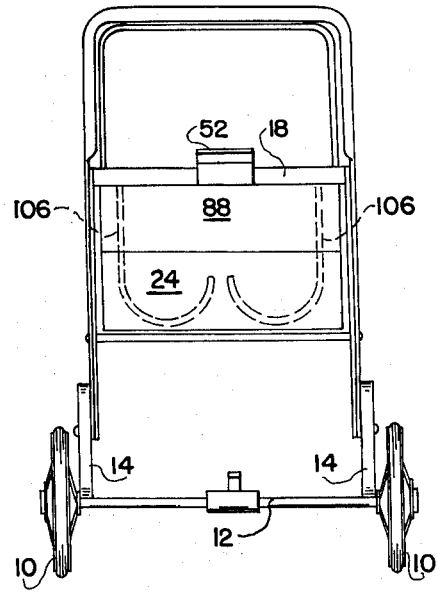
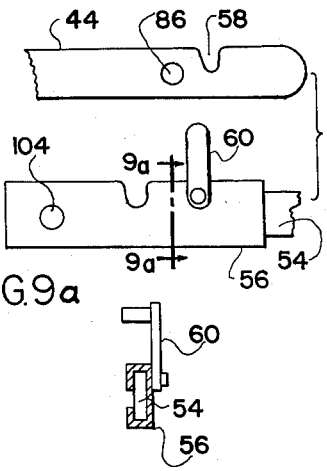

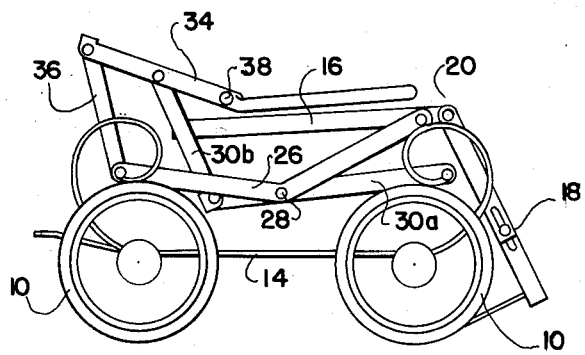
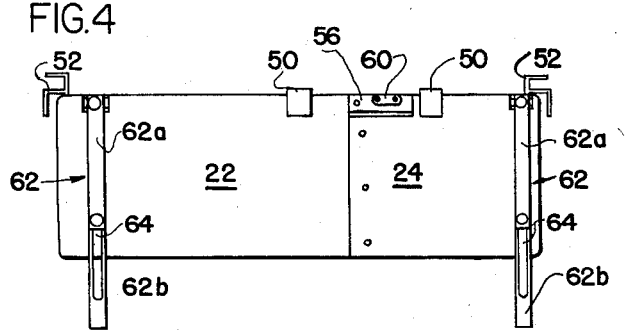
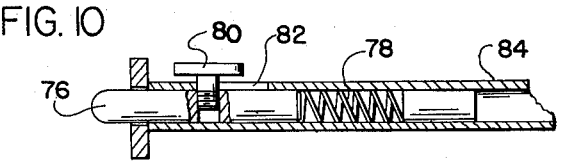
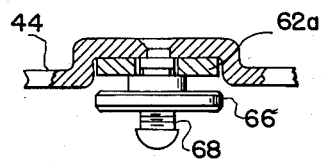
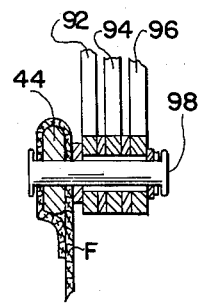

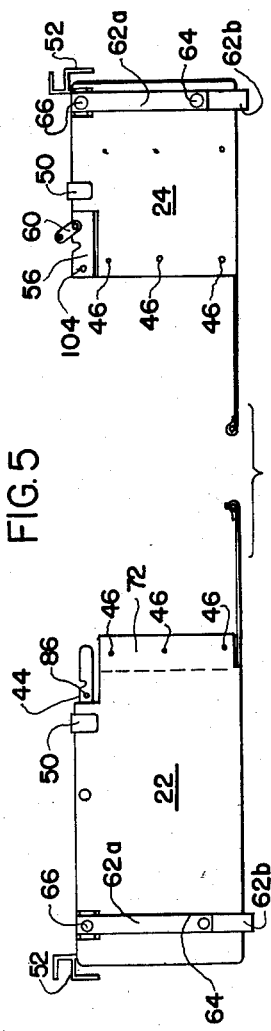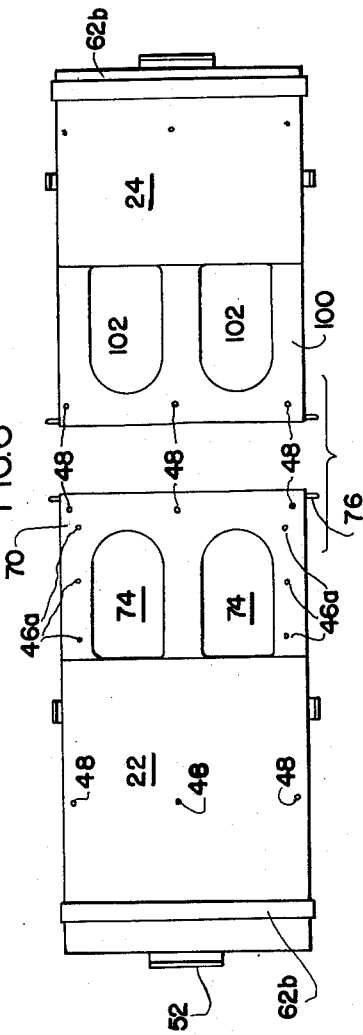
FIG.5
FIG.6

United States Patent Office 3,094,339
Patented June 18, 1963

3,094,339
CONVERTIBLE BABY CARRIAGE
Harriet Hurvitz, 25 Westbourne Parkway,
Hartford, Conn.
Filed May 14, 1962, Ser. No. 194,411
3 Claims. (Cl. 280—31)

This invention relates to an improved baby carriage construction and, more particularly, to the construction of a carriage that can be converted into a stroller, a baby bed or bassinet, and a car seat.

It is the general object of the invention to provide a carriage construction of the aforementioned type which is simple and economical to build and which is particularly characterized by the simplicity with which it can be converted from carriage to stroller to bed and to car seat so that little time is involved in making any conversion by even unskilled persons.

The drawings show a preferred embodiment of the invention and such embodiment will be described, but it will be understood that various changes may be made from the construction disclosed and that the drawings and description are not to be construed as defining or limiting the scope of the invention, the claims forming a part of this specification being relied upon for that purpose.

Of the drawings:

FIG. 1 is a side elevational view of the convertible carriage;

FIG. 2 is a front end view of the carriage;

FIG. 3 is a side elevational view showing the carriage frame collapsed;

FIG. 4 is a side elevational view of the bed portion of the carriage;

FIG. 5 is a view similar to FIG. 4 but showing the stroller and car seat portions of the bed separated;

FIG. 6 is a bottom view of the aforesaid separated stroller and car seat portions;

FIG. 9 is a detail view of the bed frame construction showing the connector between the car seat and stroller portions thereof;

FIG. 9a is a cross-sectional view taken as indicated by the line 9a—9a of FIG. 9;

FIG. 10 is a cross-sectional view showing a detail of the front wall lock used in both the car seat and the stroller sections of the bed;

FIG. 11 is a detail cross-sectional view of the connection between the bed legs and the frame thereof;

FIG. 12 is a cross-sectional detail view of the canopy frame connection; and

Figure 7:
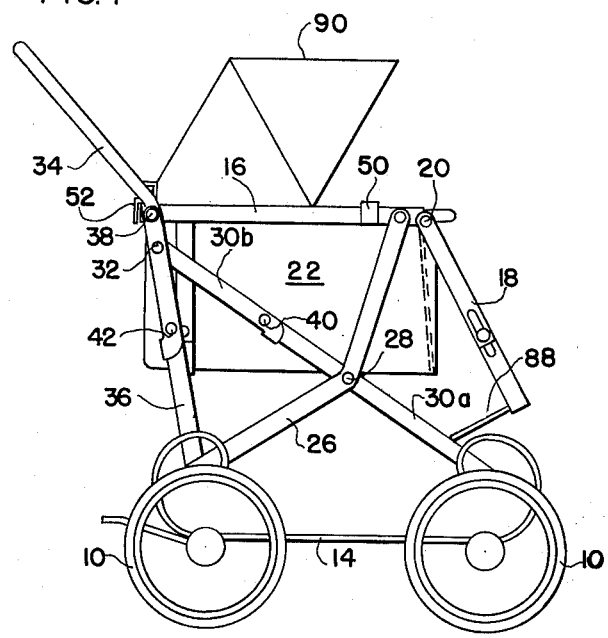
FIG. 7 is a side elevational view of the carriage converted to use as a stroller.

As shown in FIGS. 1 and 2, the fully assembled baby carriage has about the same appearance as most baby carriages. It rides on four wheels 10, 10 which are connected in pairs by axles 12, 12 to form a chassis which also includes a pair of longitudinally extending spring members 14, 14 which are connected to the longitudinally spaced apart axles 12, 12. The ends of the spring members 14, 14 curve upwardly and inwardly to provide spring support for the carriage frame.

The carriage frame structure includes a top, normally horizontally disposed rectangular support comprising a back U-shaped frame member 16 and a front U-shaped frame member 18. These members are normally connected in rigid relationship at their ends as indicated at the point 20, but they can be pivoted relative to each other when converting the carriage frame for stroller use. The open generally rectangular carriage frame section defined by the members 16 and 18 is provided for hanging the body or bed portion of the carriage therein. The said bed comprises two interconnected units, these being the rear or stroller unit 22 and the front or car seat unit 24.

The rectangular carriage frame portion described above is held in the horizontal position shown in FIGS. 1 and 2 by crossed frame elements at the sides. These crossed frame elements at each side include an angular member 26 which is connected at its bottom end to a chassis spring 14 near the rear wheels and it is connected at its upper end to the front portion of the rear U-shaped frame member 16. Intermediate its ends, and at the apex of its angle, it is pivotally connected at 28 to a two-section crosspiece 30a and 30b which is connected at one end to a spring member 14 adjacent the front wheel and extends rearwardly. The rear upper end of the two-section crosspiece 30a and 30b is pivotally connected at 32 to a generally U-shaped handle 34. The handle 34 is connected to a frame member 36 at each side, each such frame member 36 being also connected to a rear end of a spring 14. The handle portion 34 is detachably connected at 38 with the rear end of the back frame member 16 of the top rectangular frame portion.

It will be observed that the crosspiece members 30a and 30b are pivotally connected at 40 and that the handle 34 and frame member 36 are pivotally connected at 42. These two last mentioned connections permit relative pivoting movement of the member 30b clockwise relative to the member 30a and permit relative clockwise movement of the handle 34 relative to the frame member 36. However, the pivot connections 40 and 42 lock when the members they join are aligned so as to provide rigid support for the carriage. When the pivots 40 and 42 are released and the handle frame connector 38 is released, the carriage frame can be collapsed to the position shown in FIG. 3.

As will be seen with reference to FIGS. 4, 5 and 6, the front or stroller unit 22 and the rear or car seat unit 24 of the carriage bed are each of basket-like construction. That is, each such section has a generally U-shaped upper frame preferably made of flat bar stock from which fabric walls are supported. The fabric is looped over the flat bar stock and sewn in place, or it may be secured by detachable means, such as snap fasteners, to facilitate removal and replacement of the fabric when necessary. The frame member of the stroller unit 22 is indicated by the reference numeral 44 and it will be seen by reference to FIG. 12 that the top portion of the fabric is secured over the said frame member. The fabric F is preferably canvas, but leather, plastic or other materials may be used and each unit has side walls and a back wall which cooperate to support a bottom wall. Counterpart walls of the units 22 and 24 are connected together by snap fasteners 46, 46 at the sides and by snap fasteners 48, 48 at the bottom. The bottom portions overlie each other in the connected relation which forms the bed shown in FIG. 4.

Each of the units 22 and 24 has a pair of side hangers 50, 50, and a combination end hanger and handle 52 is provided for each unit, the hangers 50 and 52 engaging over the carriage frame elements 16 and 18 to support the bed in the carriage frame.

The U-shaped frame element 44 of the stroller unit 22 and the U-shaped frame element 54 of the car seat section 24 are detachably connected together at their ends as illustrated in FIGS. 9 and 9a. That is, a bracket 56 is secured to each end of the frame member 54 as shown in FIG. 9 to receive the projecting associated end of the frame member 44. Each end of the frame member 44 is provided with a bayonet slot 58 as is the bracket 56, and a pivoted latch 60 is supported on the bracket to engage in the two slots when they register and to hold the two U-shaped frame members in connected relationship.

Each of the units 22 and 24 is also provided with leg means comprising a U-shaped member 62 which is fastened at its ends to the sides of the frame member 44 or 54 with which it is associated. The arms of each U-shaped leg are of adjustable length and comprise two members 62a and 62b which are slidably adjustably connected by pin and slot means indicated generally at 64.

When the units 22 and 24 are connected together as shown in FIG. 4 they comprise a bassinet or bed. With the legs extended as shown, the combined units function like a conventional bassinet which is supported in an elevated position on a table or floor. When the legs are retracted, the combined units comprise a car bed that can conveniently be placed on an automobile seat.

A three-section mattress (not shown) is preferably employed with the bassinet or bed and is provided in composite length substantially equal to the length of the bed. One of the sections is preferably disconnected from the others so that it can be used as a seat cushion in either the stroller or the car seat unit. The other sections are preferably foldably connected so as to provide a composite seat cushion and back rest for either the car seat or stroller.

In further keeping with the present invention, the legs 62, 62 can also be used as handles for carrying the bed. That is, the upper end sections 62a of the said legs are connected to the associated frame members, as shown in FIG. 11. As shown there, the associated frame member is offset at its connection with the leg section 62a and a nut 66 is tightened on a threaded stud 68 to secure the connection against pivoting movement. However, when the nut 66 is loosened, the leg section 62a can be pivoted to a position parallel with its associated frame member and the nut again tightened. With the legs pivoted to positions parallel with the frame members 44 and 54, the said legs can be used as extending end handles for carrying the bed.

Referring now to the stroller unit as best shown in FIGS. 5, 6 and 7, it will be observed that the fabric body has an extending bottom flap 70 and extending side flaps 72, 72 for engagement with the auto seat portion by means of the snap fasteners 46 and 48. The bottom flap 70 has leg openings 74, 74 therein and this bottom flap is to be folded upwardly into a substantially vertical position so that an infant seated in the stroller can project its legs through the openings. The end of the said bottom flap is looped to contain a hollow rod 84, and a spring biased plunger 76 (FIG. 10) extends from each end of the loop. The plunger 76 is biased outwardly by a spring 78, but it can be retracted by a pin 80 threaded into the plunger and movable in a slot 82 in the rod 84. The plunger 76 at each end of the rod 84 is to be engaged within an aperture 86 in the associated end of the frame member 44. When the bottom flap is folded upwardly and supported as described, the side flaps 72, 72 are folded inwardly on the bottom flap and secured thereto on the fastener elements 46a, 46a.

The stroller section 22 as thus assembled is supported on the frame section 16 of the carriage, and the frame section 18 thereof is pivoted downwardly to the position shown in FIG. 7. The said frame section 18 has a foot board 88 extending across its web for the infant to support its feet on. Thus, a child can be seated comfortably in the stroller section with its legs projecting through the openings 74, 74 and with the feet resting on the foot board 88.

A canopy 90 (FIGS. 1 and 7) is attached to the stroller section so as to be in position with the stroller or with the assembled carriage. The said canopy has three ribs 92, 94 and 96 which are pivotally connected at the point 98 to each side of the frame member 44 as shown in FIG. 12. Thus, the canopy can be collapsed or held erect because of the frictional engagement of the ribs 92, 94 and 96 on the pivot axis 98.

Figure 8:
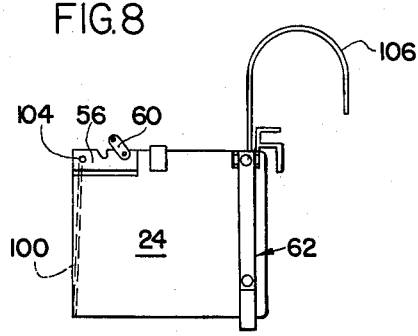
FIG. 8 is a side elevational view of the car seat portion fully assembled.

The car seat unit 24 (FIGS. 5, 6 and 8) is similar to the stroller unit 22 in that it has a bottom flap 100 provided with leg openings 102, 102 and which is to be folded upwardly and secured when the car seat is being used. The means for securing the flap 100 in the vertical position are the same as those shown for the stroller in FIG. 10, the plunger in this case being engaged in an aperture 104 in the frame member 54 and the bracket 56 at each end of the said frame member.

The car seat 24 is supported in position in an automobile, or in any large chair, on two hooks 106, 106 (FIGS. 2 and 8) which are normally folded inwardly and downwardly with respect to the seat as shown in FIG. 2. However, they are secured to the frame member 18 so that they can be pivoted upwardly and then turned outwardly to the position shown in FIG. 8 so that they can be looped over the back rest of an automobile seat to support the infant's seat in a suitable position.

Figure 13:
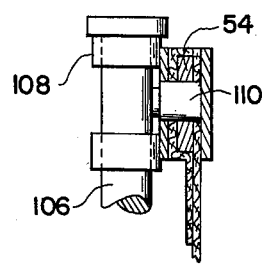
FIG. 13 is a detail view of hook connection to the bed or car seat frame.

The manner in which the hooks 106, 106 are mounted for the aforesaid purpose is shown in FIG. 13, and it will be noted that each hook 106 is secured at its straight end in a bracket 108 which includes a pin 110 pivotally secured to the frame member 54. By pivoting the hook about the pin axis, it can be raised to an elevated position and then rotated about its straight end axis in the bracket 108 to the hanging position.

The invention claimed is:

1. A convertible baby carriage comprising in combination, a carriage frame structure which includes a generally rectangular normally horizontal support comprising front and rear U-shaped frame pieces connected at their ends, a bed including a second generally rectangular horizontal support comprising front and rear U-shaped members detachably connected at their ends and each supporting fabric side walls and an end wall which cooperate to support a fabric bottom wall and thereby to define a unit, the fabric walls of one unit being detachably connected to their counterparts on the other unit when such units are connected and the bottom wall portions having flap extensions provided with leg openings but which are connected in overlapped relationship to cover said openings, hanger means interconnecting the two generally rectangular supports with the second support detachably held within the first support so that it can be lifted out of the carriage frame, said bed also including extensible legs respectively connected at their ends to the front and rear U-shaped members to provide independent support for the bed, the front unit being detachable to provide an infant's seat and the extending flap of the bottom wall thereof being connectible with the detached ends of its U-shaped member to provide a front closure for such seat, the rear unit being supportable independently in the carriage frame and the extending flap of the bottom wall thereof being connectible to the ends of its U-shaped member to provide a front closure for a stroller thus formed, and the front U-shaped frame piece of the carriage being pivotally movable downwardly to provide a foot rest for the stroller.

2. A convertible baby carriage comprising in combination, a carriage frame structure which includes a generally rectangular normally horizontal support structure comprising front and rear U-shaped frame pieces connected at their ends, a bed including a second generally rectangular horizontal support comprising front and rear U-shaped members detachably connected at their ends and each supporting fabric side walls and an end wall which cooperate to support a fabric bottom wall and thereby to define a unit, the fabric walls of one unit being detachably connected to their counterparts on the other unit when such units are connected and the bottom wall portions having flap extensions provided with leg openings but which are connected in overlapped relationship to cover said openings, hanger means interconnecting the two generally rectangular supports with the second support detachably held within the first support so that it can be lifted out of the carriage frame, said bed also including extensible legs adjustably connected to the respective front and rear U-shaped members to provide independent support for the bed and to provide carrying handles therefor, the front unit being detachable to provide an infant's car seat and the extending flap of the bottom wall thereof being connectible with the detached ends of its U-shaped member to provide a front closure for the car seat, hook means secured to said front U-shaped member for supporting the car seat independently of the carriage frame, the rear unit being supportable independently in the carriage frame and the extending flap of the bottom wall thereof being connectible to the ends of its U-shaped member to provide a front closure for a stroller thus formed, and the front U-shaped frame piece of the carriage being pivotally movable downwardly to provide a foot rest for the stroller.

3. A convertible baby carriage comprising in combination, a collapsible carriage frame structure which includes a generally rectangular normally horizontal support comprising front and rear U-shaped frame pieces connected at their ends, a bed including a second generally rectangular horizontal support comprising front and rear U-shaped members detachably connected at their ends and each supporting fabric side walls and an end wall which cooperate to support a fabric bottom wall, the fabric walls supported by one such U-shaped member being detachably connected to their counterparts on the other U-shaped member when such members are connected and the bottom wall portions having flap extensions provided with leg openings but which are connected in overlapped relationship to cover said openings, hanger means interconnecting the two generally rectangular supports with the second support detachably held within the first support so that it can be lifted out of the carriage frame, said bed also including a pair of extensible U-shaped legs respectively connected at their ends to the respective front and rear U-shaped members to provide independent support for the bed, the front U-shaped member of the bed and its fabric walls being detachable to provide an infant's car seat and the extending flap of the bottom wall thereof being connectible with the detached ends of the front U-shaped member to provide a front closure for the car seat, hook means secured to said front U-shaped member for supporting the car seat independently of the carriage frame and independently of its associated U-shaped leg, the rear U-shaped member and its fabric walls being supportable independently in the carriage frame and the extending flap of the bottom wall thereof being connectible to the ends of the rear U-shaped member to provide a front closure for a stroller thus formed, and the front U-shaped frame piece of the carriage being pivotally movable downwardly to provide a foot rest for the stroller.

References Cited in the file of this patent

UNITED STATES PATENTS

| | | |
|---|---|---|
| 2,300,425 | Kiesow | Nov. 3, 1942 |
| 2,730,163 | Goldberg | Jan. 10, 1956 |
| 2,777,706 | Welsh | Jan. 15, 1957 |
| 2,872,203 | Hedstrom | Feb. 3, 1959 |
| 2,967,059 | Goldberg | Jan. 3, 1961 |